Patented Dec. 11, 1928.

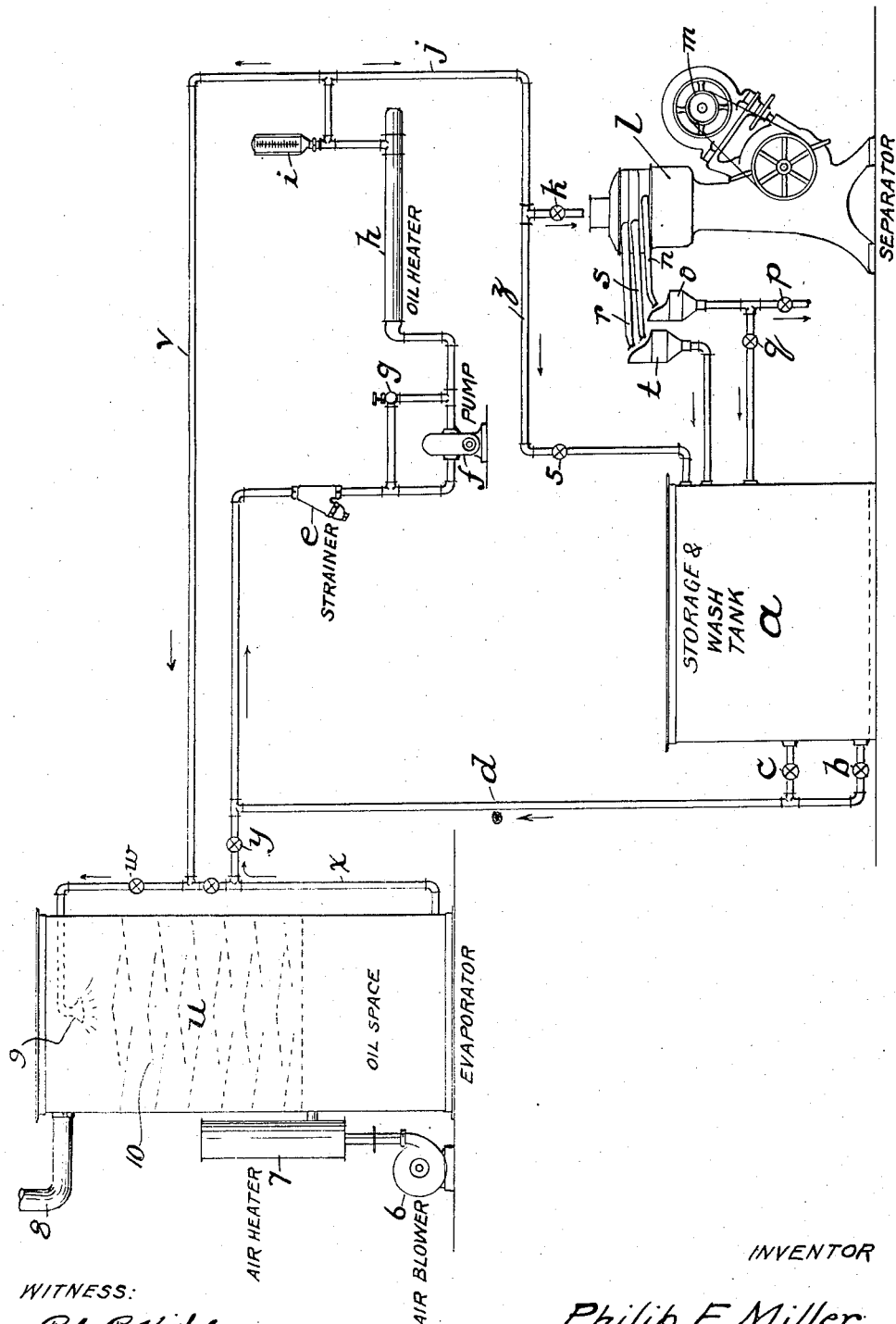

1,694,478

UNITED STATES PATENT OFFICE.

PHILIP F. MILLER, OF MAPLEWOOD, NEW JERSEY, ASSIGNOR TO THE DE LAVAL SEPARATOR COMPANY, OF NEW YORK, N. Y., A CORPORATION OF NEW JERSEY.

APPARATUS FOR RECLAIMING USED LUBRICATING OIL.

Application filed September 6, 1924. Serial No. 736,251.

My invention comprises an improved and simplified apparatus for use in the purification of used lubricating oil.

The object of my invention is to remove from used oil (an example of which is that which has been used in internal combustion engines) practically all materials which have contaminated it and, by so doing, to render it fit for re-use in place of new oil.

It is known that in internal combustion engines, especially those used in motor cars, the oil becomes rapidly contaminated with road dirt, metallic particles, carbon, water, and unburned fuel which leaks past the piston rings. These impurities may be grouped in three classes.

1. Those heavier than the oil and only mechanically mixed with it, principally the gritty particles and water.

2. Those in a more or less colloidal state: namely, the finely divided carbon, etc.

3. Those in a true solution: namely, the unburned fuels that have leaked past the piston.

Each of the above impurities acts in a different deleterious manner in an engine.

The gritty particles act as an abrasive and increase wear.

The finely divided carbon tends to clog the oil passages and may work past the piston and cause an increased carbon deposit in the cylinders.

Worst of all, the unburned fuel mixed with the oil reduces its viscosity very rapidly at all times and with especially great rapidity in cold weather. Authentic tests have proven that when the viscosity of internal combustion lubricating oil is reduced below a certain point, it ceases to act as a continuous film between the wearing surfaces, so that actual metallic contact exists, producing excessive friction and destructive wear.

It is this rapid reduction in the viscosity of oil which has led the makers of motor vehicles to recommend that the oil be changed at stated periods not to exceed 1000 miles. Discarding oil used for this period of time involves a collective waste of great volume.

While numerous efforts have been made to reclaim this oil for further use, they have achieved only partial success, owing largely to the character of the apparatus employed.

My invention comprises a simplified and efficient apparatus wherein the oil may be subjected, in an economical and expeditious manner, to a series of steps of such character that, at the conclusion of the process, all of the impurities hereinbefore recited will have been removed.

The oil is first circulated through a heater and is then subjected to a treatment which will remove all of the gritty particles and any moisture which may be present. Such treatment may be effectively applied in a suitable centrifugal machine, such, for example, as that shown in Snyder Patent No. 1,283,343. While centrifugal separation is preferable, because of its thoroughness and rapidity, it is possible to accomplish a modicum of the desired separation by gravity settling for long periods of time.

In the second step of the process, there is added to the oil a chemical reagent adapted to act as a counter-colloid and cause an agglomeration of the carbon contained in the oil. The oil is then subjected to a treatment wherein advantage is taken of the higher specific gravity of the counter-colloid and agglomerated carbon to effect their separation from the oil. Preferably, this is effected in the same apparatus in which the gritty particles and moisture were removed, especially if this be a centrifuge. This produces an oil free from all visible impurities and of good color.

As a third and final step, the oil is circulated through a vertical tower containing baffles or other media, such as a bed of charcoal, for distributing the oil in fine layers. At the same time, a current of air is blown up through the tower counter-current to and through the oil, the air being preferably heated to accelerate the vaporization. The circulation of the oil is continued until its contact with warm air has been sufficient to vaporize the undesirable diluents of the oil, thus restoring the viscosity and flash point. It has been found that during the evaporation of diluents, the oil may be contaminated by particles of dust from the air or pieces of solid matter from the baffle media, so after diluents are removed the clean oil spout of the separator may be turned around so as to discharge into a receptacle for clean oil, the valve $k$ is opened and the valve $w$ closed, and the oil run through the separator into the receptacle.

When properly handled, motor oil reclaimed by this process has properties equal to or better than the original new oil and is perfectly satisfactory for re-use.

In the accompanying drawing, which shows in elevation somewhat diagrammatically a preferred type of apparatus embodying my invention, $a$ is a tank for storage of oil to be reclaimed or to which oil, which has been stored elsewhere may be delivered. $b$ and $c$ are valves connecting the tank $a$ with a pipe $d$ leading through a strainer $e$ to the suction side of a pump $f$. As it is not convenient to provide a variable speed drive for the pump, I arrange to drive it at a uniform speed giving the maximum desired rate and provide a spring-loaded valve $g$ that permits oil pumped in excess of smaller desired rates to by-pass from the discharge side to the suction side of the pump. $h$ is an oil heater in the oil line beyond the pump. The heater, beyond which is a thermometer $i$, connects with branch pipes $j$ and $v$. Pipe $j$ conveys oil either to a centrifuge $l$ or to a branch pipe $z$; a valve $k$ controlling the flow of the oil. The centrifuge may be driven by any means, preferably by an electric motor $m$. From the centrifuge there are three outlet spouts. The lower one $n$ discharges into a funnel $o$, which may in turn discharge either through a valve $p$ to a sewer, or through a valve $q$ back into the tank $a$. The upper outlet $r$ and the middle outlet $s$ discharge into a funnel $t$, which in turn discharges back into the tank $a$.

$u$ is an evaporating tank having its upper portion provided with baffles or filled with granulated charcoal. The branch pipe $v$ leads through a valve $w$ to a spray head 9 in the top of the tank $u$. 10 represents any suitable arrangement of baffles for distributing the oil in thin layers. A pipe $x$ leads from the bottom of the tank through a valve $y$ and joins the suction pipe $d$ leading to the pump. The branch pipe $z$ from the hot oil pipe $j$ leads through a valve 5 back to the tank $a$. 6 is a blower adapted to force air through a heater 7 into the lower part of the evaporator $u$. 8 is a vent from the evaporator.

In operation, used oil from tank $a$ is passed through valve $b$, pipe $d$, strainer $e$, pump $f$, heater $h$ (wherein it should be heated to about 160° F.), pipe $j$ and valve $k$ to the centrifuge $l$, which at this time is being rotated. Heavy solid dirt is retained in the centrifuge. Water is discharged through the lower spout $n$ and flows through funnel $o$ and valve $p$ into a sewer. The clarified oil leaves by the middle spout $s$ and returns to the tank. Any overflow discharges through pipe $r$. Such clarified oil, because of its higher temperature and the removal therefrom of dirt and water, is of lower specific gravity than the untreated oil in tank $a$ and will therefore tend to float on top. Some mixing may occur, so that the oil should be circulated through the centrifuge for a longer time than if a separate tank were used for the clarified oil; but the additional cost of the extra running is not enough to warrant the installation of separate tanks.

After the dirt and water have been removed, I add a water solution of a counter-colloid to the clarified oil in tank $a$. The oil is circulated from the bottom of the tank $a$ through the same pipes as in the first step of the process, except that valve $k$ is turned to cause the oil to return, by the pipe $z$ and valve 5, to the tank $a$. After so circulating until all the oil has been acted upon by the counter-colloid, valve $k$ is partially opened, and valve 5 partially closed, so that oil passes through the centrifuge $l$. The water, counter-colloid and agglomerated carbon emerge from the lower spout $n$ and may be allowed to escape, through funnel $o$ and valve $p$, to the sewer. The cleaned oil emerges from the middle spout $s$ and returns to the tank.

After so circulating through the centrifuge $l$ until all the carbon has been removed, valves $k$ and 5 should be closed and valve $w$ opened so that the oil will be conveyed through pipe $v$ and be sprayed into the top of the evaporator. The blower 6 and heater 7 should now be started to cause a circulation of hot air upward through the evaporator. When all oil is out of tank $a$, the valve $b$ should be closed and valve $y$ opened. The pump will then draw oil from the bottom of the evaporator, pass it through the heater $h$ and pipes $v$ and $w$ and spray head 9 into the top of the evaporator. In its downward passage through the evaporator, it comes in contact with the upwardly moving hot air from the heater 7, which absorbs and carries off, through vent pipe 8, any fuel oil with which it has become diluted, leaving the oil in practically the condition of the original new oil.

The counter-colloid solution that I prefer to use in the second step of my process is trisodium phosphate; but the successful practice of the process is not dependent on the use of any particular carbon-agglomerating agent. As examples of permissible substitutes may be mentioned oleic acid and soda ash. The counter-colloid may be conveniently added to the oil in tank $a$; or it may be added gradually to the flowing stream of oil. The proportion of such agent to the oil will vary with the agent selected and the condition of the oil. Three per cent is a typical percentage.

The condition of used oil is usually such as to require its subjection to the three treatments described, preferably, but not necessarily, in the order described; but the oil may be, exceptionally, in such condition as not to necessitate its subjection to all three treatments. It is obvious that the apparatus is capable of carrying out either one or any two of the treatments described to the exclusion of the other treatment or treatments; although its main utility depends upon its capacity to carry out all three treatments, whether or not it may be always so used.

The apparatus embodying my invention is of particular advantage in that it permits of the various treatments comprising the complete process to be carried out without that duplication of elements that would be necessitated if the several steps of the process were carried out in separate apparatuses.

Having now fully described my invention, what I claim and desire to protect by Letters Patent is:

1. In an apparatus for reclaiming used lubricating oil, the combination of a tank for containing the used oil, a centrifugal separator provided with outlets for relatively light and heavy constituents, an evaporator, a main conduit for used oil leading from the tank, a pump and a heater interposed in said conduit, three branch conduits communicating with the main conduit, one branch conduit leading to the centrifuge, the second branch conduit leading back to the tank and the third branch conduit leading to the upper part of the evaporator, and means to convey liquid from the light constituent outlet of the centrifuge to the tank above the level of the outlet therefrom to the main conduit, whereby oil can be circulated from the tank successively through the main and first branch conduits and centrifuge to the tank, through the main and second branch conduits to the tank, and through the main and third branch conduits to the evaporator.

2. In an apparatus for reclaiming used lubricating oil, the combination of a tank for containing the used oil, a centrifugal separator, an evaporator, a main conduit for used oil leading from the tank, a pump and a heater interposed in said conduit, three branch conduits communicating with the main conduit, one branch conduit leading to the centrifuge, the second branch conduit leading back to the tank and the third branch conduit leading to the upper part of the evaporator, and a conduit connecting the lower part of the evaporator with the main conduit, whereby the oil may be pumped from the main conduit to the centrifuge or back to the tank or to the upper part of the evaporator and from the lower part of the evaporator into the main conduit.

3. In an apparatus for reclaiming used lubricating oil, the combination of a tank for containing the used oil, a main conduit for used oil leading from the tank, a pump and a heater interposed in said conduit, a centrifugal separator, an evaporator, three branch conduits from the main conduit, one branch conduit leading to the centrifuge, another branch conduit leading back to the tank, and a third branch conduit leading to the upper part of the evaporator, and a conduit connecting the lower part of the evaporator with the main conduit between the tank and the heater.

4. In an apparatus for reclaiming used lubricating oil, the combination of a tank for containing the used oil, a main conduit for used oil leading from the tank, a pump and a heater interposed in said conduit, a centrifugal separator, an evaporator, three branch conduits from the main conduit, one branch conduit leading to the centrifuge, another branch conduit leading back to the tank, and a third branch conduit leading to the upper part of the evaporator, a fourth conduit connecting the lower part of the evaporator with the main conduit, and a short-cut connection from the fourth conduit to the third conduit.

In testimony of which invention, I have hereunto set my hand, at New York, on this 8th day of August, 1924.

PHILIP F. MILLER.